E. L. Cooke,

Orange Knife.

No. 100,862.　　　　　Patented Mar. 15, 1870.

Witnesses.　　　　　Inventor.

E. W. Beiss

Jeremy W. Bliss　　　　　Edward L. Cooke

United States Patent Office.

EDWARD L. COOKE, OF HARTFORD, CONNECTICUT.

Letters Patent No. 100,862, dated March 15, 1870.

IMPROVEMENT IN ORANGE-KNIFE.

The Schedule referred to in these Letters Patent and making part of the same.

*To all whom it may concern:*

Be it known that I, EDWARD L. COOKE, of Hartford, county of Hartford, and State of Connecticut, have invented certain new and useful Improvements in Orange-Peelers; and to enable others skilled in the art to make and use the same, I will proceed to describe, referring to the drawings, in which the same letters indicate like parts in each of the figures.

The nature of this invention consists of a curved blunt-edge blade, secured to an appropriate handle, the object of which is to remove one-half of the peel from an orange, without cutting or wasting the same.

To be more particular, in the accompanying drawings—

Figure 1:
Figure 1 is a side view of a blade, and one kind of a handle.
Figure 2:
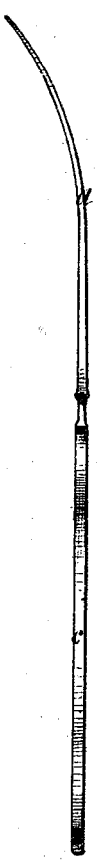
Figure 2 is an edge view of the same.

*a* is the blade, having a round end and blunt edge, the flat surface *b* of which is bent in curve form, and secured in or to a handle, *c*, or of any other desired form convenient for holding and using said blade.

In using this implement, I first cut a hemispherical slit through the peel, then insert the blade through the slit, between the orange and its peel, and work it gradually around to the starting point, then repeat the same operation on the other half, when the peel can be easily and quickly removed without injury or waste to the orange.

Thus by the use of this implement the peel may be easily and quickly removed from an orange, lemon, or other fruit of like nature, thereby rendering it a useful and desirable article of use and trade.

I believe I have thus shown the nature and advantage of this implement, so as to enable others skilled in the art to make and use the same therefrom.

What I claim therefore, and desire to secure by Letters Patent, is—

The curved blunt-edge blade *a*, with a handle appropriate thereto, as a new article of manufacture, substantially as set forth.

EDWARD L. COOKE. [L. S.]

Witnesses:
E. W. BLISS,
JEREMY W. BLISS.